(12) United States Patent
Bandara

(10) Patent No.: US 10,354,197 B2
(45) Date of Patent: Jul. 16, 2019

(54) PATTERN ANALYTICS FOR REAL-TIME DETECTION OF KNOWN SIGNIFICANT PATTERN SIGNATURES

(71) Applicant: CA, Inc., New York, NY (US)

(72) Inventor: Vidarshana Wijethilaka Bandara, Fort Collins, CO (US)

(73) Assignee: CA, Inc., New York, NY (US)

( * ) Notice: Subject to any disclaimer, the term of this patent is extended or adjusted under 35 U.S.C. 154(b) by 902 days.

(21) Appl. No.: 14/940,830

(22) Filed: Nov. 13, 2015

(65) Prior Publication Data

US 2017/0140295 A1    May 18, 2017

(51) Int. Cl.
  *G06F 15/18*   (2006.01)
  *G06N 7/02*    (2006.01)

(52) U.S. Cl.
  CPC ..................... *G06N 7/02* (2013.01)

(58) Field of Classification Search
  CPC ............. G06N 7/023; G06N 7/02; G06N 5/00
  USPC ..................................................... 706/15, 45
  See application file for complete search history.

(56) References Cited

U.S. PATENT DOCUMENTS

| | | | |
|---|---|---|---|
| 2010/0234748 A1* | 9/2010 | Moorman ........... | A61B 5/02405 600/509 |
| 2014/0188940 A1* | 7/2014 | Bak .................... | G06K 9/00771 707/793 |
| 2017/0139759 A1* | 5/2017 | Bandara ............... | G06F 11/079 |

OTHER PUBLICATIONS

Xie, et al., Max-Clique: A Top-down Graph-based Approach to Frequent Pattern Mining, 2010, IEEE, pp. 1139-1143 (Year: 2010).*

\* cited by examiner

*Primary Examiner* — David R Vincent
(74) *Attorney, Agent, or Firm* — Baker Botts L.L.P.

(57) ABSTRACT

A method includes reading a plurality of historical data from a storage. The method also includes generating, using a processor, a candidate pattern list. The method also includes determining, using the points stored in the candidate pattern list, whether at least one maximal clique exists in the candidate pattern list, each maximal clique indicating a known significant pattern. The method further includes, in response to determining that at least one maximal clique exists in the candidate pattern list, for each of the at least one maximal cliques, determining a signature of the maximal clique and storing the signature of the maximal clique and an identifier identifying the known significant pattern to a library in the storage. The method further includes determining causal relationships between the identified significant patterns and storing in the library.

20 Claims, 6 Drawing Sheets

PATTERN ANALYTICS FOR REAL-TIME DETECTION OF KNOWN SIGNIFICANT PATTERN SIGNATURES

BACKGROUND

The disclosure relates generally to pattern analytics, and more specifically to pattern analytics for real-time detection and prediction of known significant pattern signatures.

SUMMARY

According to one embodiment of the disclosure, a method includes reading a plurality of historical data from a storage. The method also includes generating, using a processor, a candidate pattern list by sweeping a first sliding window through the plurality of historical data from an oldest point of historical data to a most recent point of historical data and sweeping a second sliding window through the plurality of historical data from a point of historical data at a current position of the first sliding window to the oldest point of historical data. The generating a candidate pattern list further includes, for each current position of the first sliding window and each current position of the second sliding window, determining, using the processor and a fuzzy logic algorithm, a correlation between at least one point in a neighborhood of the current position of the first sliding window and at least one point in a neighborhood of the current position of the second sliding window, and storing the at least one point in the neighborhood of the current position of the first sliding window, the at least one point in the neighborhood of the current position of the second sliding window, and the correlation into the candidate pattern list. The method also includes determining, using the points stored in the candidate pattern list, whether at least one maximal clique exists in the candidate pattern list, each maximal clique indicating a known significant pattern. The method further includes, in response to determining that at least one maximal clique exists in the candidate pattern list, for each of the at least one maximal cliques, determining a signature of the maximal clique and storing the signature of the maximal clique and an identifier identifying the known significant pattern to a library in the storage.

According to another embodiment of the disclosure, a method for predicting a significant pattern in real-time includes identifying a first pattern in a plurality of real-time data. The method further includes determining, using a processor, whether the first pattern has been marked as a known significant pattern by searching for the first pattern in a library of known significant patterns in a storage. The method also includes, in response to determining that the first pattern has been marked as a known significant pattern, determining whether the first pattern has a causal relationship with a second pattern, the second pattern also marked as a known significant pattern in the library. The method further includes, in response to determining that the first pattern has a causal relationship with the second pattern, determining a strength of the causal relationship between the first pattern and the second pattern. The method also includes, based on the strength of the causal relationship, predicting whether the second pattern will occur, and, in response to predicting that the second pattern will occur, alerting a system administrator in real-time that the second pattern will occur.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
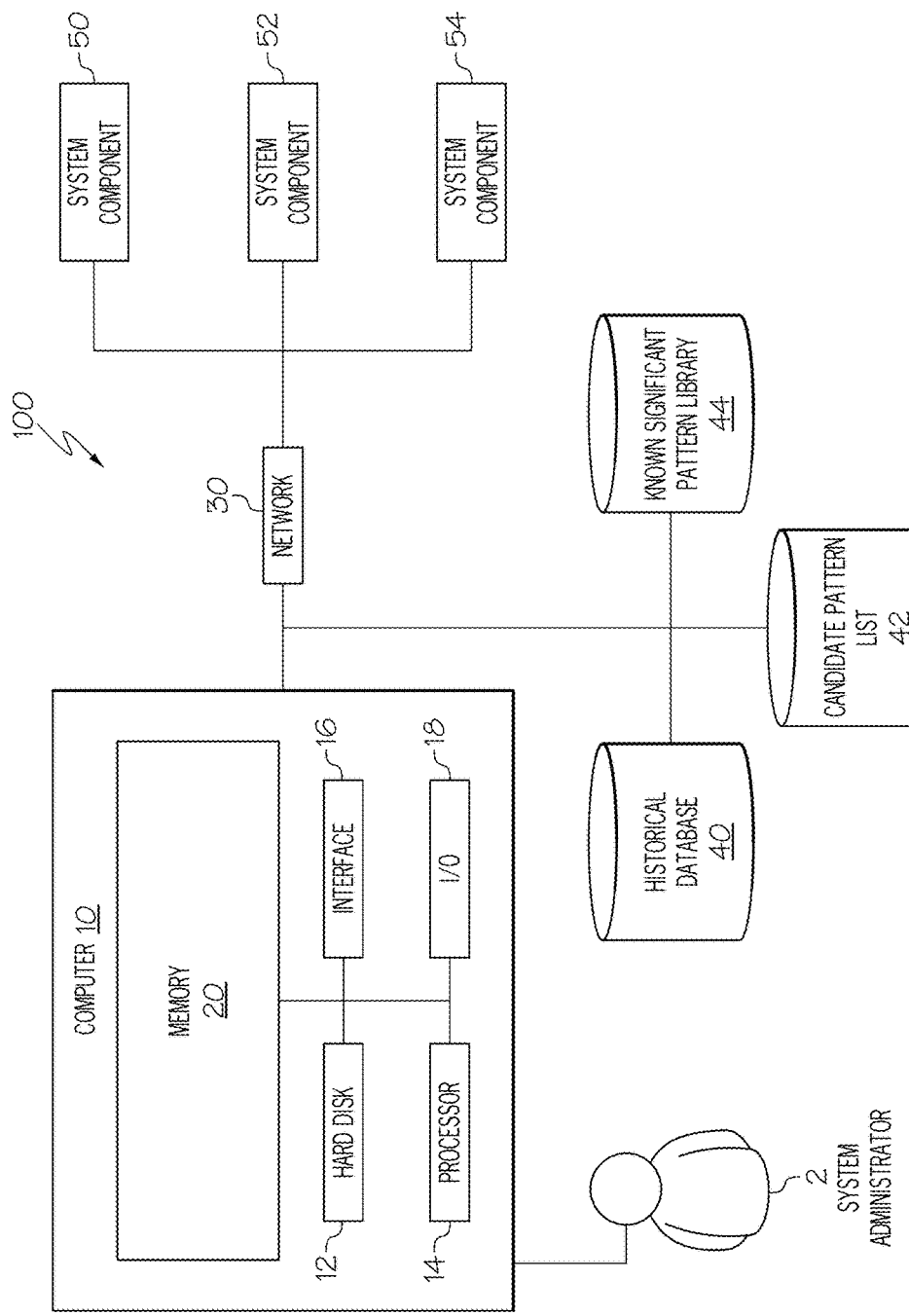
FIG. 1 illustrates a block diagram of a system for pattern analytics for real-time detection of known significant pattern signatures in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, mathematical languages such as MATLAB®, R®, Mathematica® and Maple®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In computing, a catastrophic failure is a complete and sudden breakdown of a system or system component, such as a computer, server, network, database, or other electronic component. Such failure may be caused by a software breakdown, for example by a bug in the system, hackers, viruses, or malware. Or such failure may be caused by a hardware breakdown, for example by a crash in the disk drive or processor, memory failure such as a buffer overflow, surge on the power line, or another break in equipment.

Catastrophic failures can wreak major havoc on a system, particularly if the failure occurs in a critical system component. This is especially true for certain cloud computing models, where a single point of failure could result in the failure of the entire system. Often, recovery from such failures is extremely costly, and the affected system component must be repaired or replaced entirely.

Cloud computing presents an extra layer of intricacy to the catastrophic failure problem in a system. Exposure to the Internet may increase the likelihood of such failures, by increasing the chances of overloading the system with data, and exposing the system to external attack by hackers or viruses. Once a cloud computing system has failed, the system may be subject to data theft or other data loss.

Existing systems identify when catastrophic failures occur, but the causes of such failures can be difficult or nearly impossible to pinpoint. In addition, oftentimes these failures occur immediately or nearly immediately, making it impossible to prevent the catastrophic failure from occurring once the underlying cause occurs.

Certain embodiments of the present disclosure provide tools for accurately predicting catastrophic failures in real-time and alerting a system administrator with sufficient time to remediate the issue. The system may enable system administrators to prevent certain catastrophic failures from occurring, or at a minimum, may enable system administrators to mitigate the damage caused by certain catastrophic failures. The system thus provides for cost and labor savings, more secure cloud computing systems generally, and less loss of data or data theft.

In certain embodiments, catastrophic failures may be preceded by consistent or nearly consistent signatures, which may be known as "known significant pattern signatures." In these embodiments, these known significant pattern signatures are determined reliably, with no (or close to no) false positives and no (or close to no) false negatives, by extracting the known significant pattern signatures from a database of historical data. These signatures build into a library against which data points are tested in real-time.

In certain embodiments, a catastrophic failure is detected in a system component. A pattern of alarms or events correlated with that failure is determined, with the highest correlated pattern likely being the cause of that failure. The system records the relationships of these patterns and the catastrophic failures that may occur. When, in real-time, the system detects that the pattern that likely causes a catastrophic failure occurred, the system administrator is alerted with specifics about the timing and system component in which the catastrophic is likely to occur, including the confidence interval that the catastrophic failure may occur. By providing such information in real-time, the system administrator can prevent or mitigate potential damage caused by the occurrence of the catastrophic failure.

Certain embodiments of the present disclosure may be used to predict any kind of event or pattern which is preceded by known significant pattern signatures. The event need not be a failure nor rise to the level of catastrophic, nor does it need to be a negative event. For example, certain embodiments of the present disclosure may be used to predict improvements in efficiency, memory usage, system speed, or any other event preceded by a known significant pattern. In such embodiments, known significant patterns may be extracted from a historical database in the manner described above. When the known significant pattern is detected in real-time, the system may predict the occurrence of a second significant pattern or event. The second significant pattern or event may signify a positive event, such as the improvements described above. Data identifying the second significant pattern or event may be stored to a library in the storage and/or sent to a system administrator for analysis. The storage may comprise memory, a drive including a hard drive or flash drive, a database, or any other storage device.

With reference to FIG. 1, a system 100 for pattern analytics for real-time detection of known significant pattern signatures is illustrated in accordance with a non-limiting embodiment of the present disclosure. System 100 includes computer 10, historical database 40, candidate pattern list 42, known significant pattern library 44, and system components 50, 52, and 54, all connected via network 30. Computer 10 includes memory 20, hard disk 12, processor 14, interface 16, and I/O 18. System administrator 2 monitors computer 10. Processor 14 loads instructions from hard disk 12 and executes them in memory 20. The instructions executed in memory 20 receive data from historical database 40, process the data, save the data to candidate pattern list 42, and save further data to known significant pattern library 44. The instructions executed on memory 20 extract known significant patterns and their signatures from the data in historical database 40.

In certain embodiments of the present disclosure, the instructions read a plurality of historical data from a storage (e.g., historical database 40). The instructions generate, using processor 14, candidate pattern list 42. Using the points stored in candidate pattern list 42, the instructions determine whether at least one maximal clique exists in candidate pattern list 42, each maximal clique indicating a known significant pattern. In response to determining that at least one maximal clique exists in candidate pattern list 42, for each of the maximal cliques the instructions determine the signature of the maximal clique and store the signature of the maximal clique and an identifier identifying the known significant pattern to a library in the storage—e.g., known significant pattern library 44. Any of historical database 40, candidate pattern list 42, or known significant pattern library 44 may be housed in memory 20 or in one or more separate storage devices.

Figure 2:
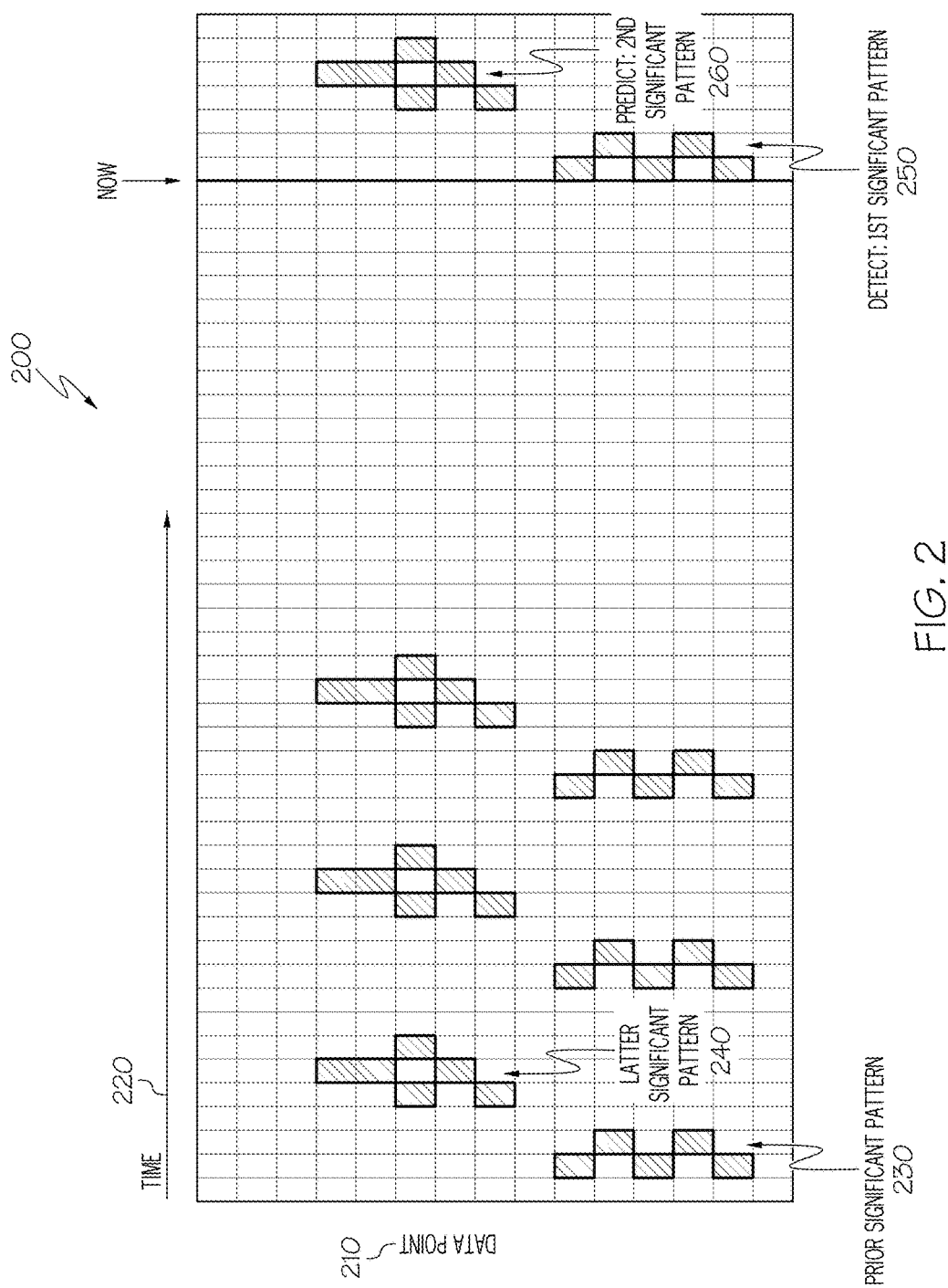
FIG. 2 illustrates an example of real-time detection of known significant pattern signatures based historical data, and real-time prediction of significant patterns based on those known significant pattern signatures

With reference to FIG. 2, a method 200 for pattern analytics for real-time detection of known significant pattern signatures is illustrated in accordance with a non-limiting embodiment of the present disclosure. FIG. 2 illustrates a series of data points 210 over time 220. Method 200 retrieves a signature, a coherence, a repeatability, and a plurality of occurrences of a maximal clique for a first known significant pattern (e.g., prior significant pattern 230) from known significant pattern library 44. Method 200 further retrieves a signature, a coherence, a repeatability, and a plurality of occurrences of a maximal clique for a second known significant pattern (e.g., latter significant pattern 240) from known significant pattern library 44. Method 200 determines whether a relationship exists between prior significant pattern 230 and latter significant pattern 240. In response to determining that a relationship exists between prior significant pattern 230 and latter significant pattern 240, method 200 determines whether the relationship between prior significant pattern 230 and latter significant pattern 240 is causal. Method 200 further determines a strength of the causal relationship between prior significant pattern 230 and latter significant pattern 240, and stores data identifying the causal relationship and the strength of the causal relationship to a library in the storage. For example, method 200 may store the aforementioned data into known significant pattern library 44.

FIG. 2 further illustrates a method for predicting a significant pattern in real-time in accordance with a non-limiting embodiment of the present disclosure. The method detects a first pattern of data points—e.g., first significant pattern 250—in a plurality of real-time data. This detection may occur at some time point in the past or at a current time point, denoted "now" in FIG. 2. The method determines, using processor 14, whether first significant pattern 250 has been marked as a known significant pattern by searching for first significant pattern 250 in known significant pattern library 44. In response to determining that first significant pattern 250 has been marked as a known significant pattern, determining whether first significant pattern 250 has a causal relationship with a second pattern, illustrated in FIG. 2 as second significant pattern 260. Second significant pattern 260 may be marked as a known significant pattern in known significant pattern library 44. In response to determining that first significant pattern 250 has a causal relationship with second significant pattern 260, determining a strength of the causal relationship between first significant pattern 250 and second significant pattern 260. Data identifying a causal relationship with a second significant pattern 260 and/or the strength of that causal relationship may be stored in known significant pattern library 44. Based on the strength of the causal relationship, the method includes predicting in real-time whether second significant pattern 260 will occur. In response to predicting that second significant pattern 260 will occur, the method may also include alerting system administrator 2 in real-time that second significant pattern 260 will occur. Second significant pattern 260 may be indicative of a catastrophic failure in which one or more of system components 50, 52, and 54 fail. Second significant pattern 260 may also be indicative of a positive event for system 100, including for example an improvement in system performance, memory usage, efficiency, or speed.

Figure 3:
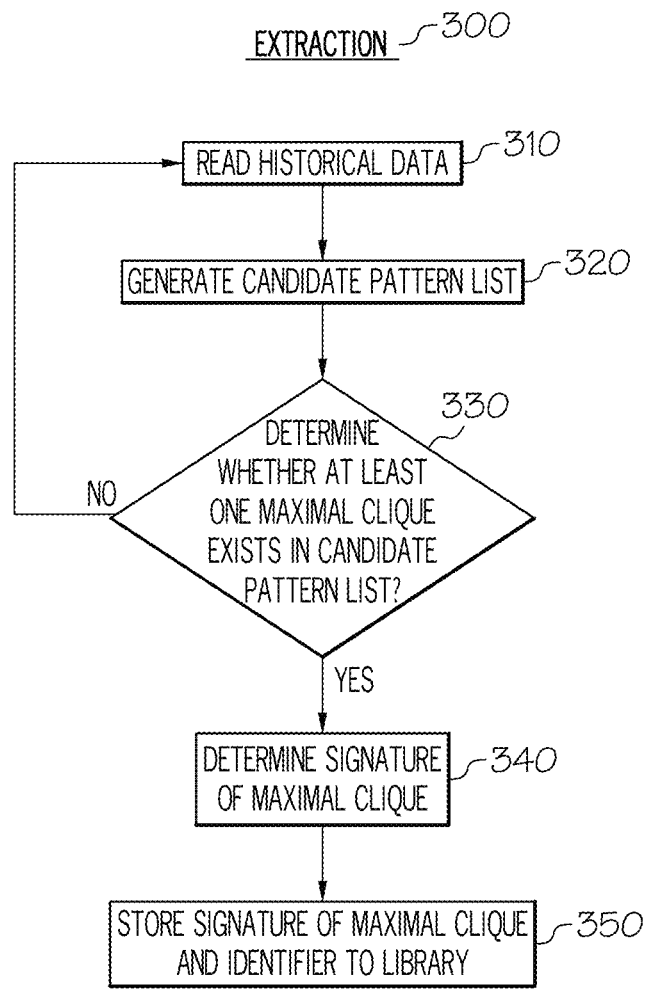
FIG. 3 illustrates a flow chart of a method extracting known significant pattern from historical data in accordance with a non-limiting embodiment of the present disclosure.

With reference to FIG. 3, a method 300 of extracting known significant patterns is illustrated in accordance with a non-limiting embodiment of the present disclosure. At step 310, method 300 reads a plurality of historical data from historical database 40. The plurality of historical data read from historical database 40 may include time series data, alarms, and/or log file entries. The time series data may include, for example, events including Quality of Service (QoS) messages. At step 320, method 300 generates, using processor 14, candidate pattern list 42. At step 330, method 300 determines, using points stored in candidate pattern list 42, whether at least one maximal clique indicating a known significant pattern exists in candidate pattern list 42. A clique may describe a group of points with similar behavior. A maximal clique may describe a clique that is not a subset of a larger clique. It is the largest group of points with the same behavior. Method 300 may separate the clique If no maximal clique exists in candidate pattern list 42, then the method 300 returns to extract the next set of data from historical database 40. If at least one maximal clique does exist in candidate pattern list 42, then at step 340, method 300 determines the signature of the maximal clique. The clique detection algorithm may provide a list of time points with a high similarity. In certain embodiments of the present disclosure, method 300 then searches for common events in the neighborhoods of the time points contained in the list. The common events across all of the time points may form the signature for that clique.

For example, a clique may exist between the time points Jan-15-08:00:00, Feb-2-09:00:00, and Feb-16-08:00:00. Method 300 may then examine the neighborhood of each time point and find the following data: Neighborhood of Jan-15-08:00:00—event-A, event-B, event-C, event-D, event-E; Neighborhood of Feb-2-09:00:00—event-K, event-B, event-C, event-D, event-L, event-M; Neighborhood of Feb-16-08:00:00—event-A, event-B, event-H, event-D, event-G. The common events across all three neighborhoods in this example are event-B and event-D. Accordingly, the signature of clique-X may be event-B and event-D. The signature may further include both time points and data points for when the pattern occurred. The signature may be held in a sparse matrix, for example a Python scipy.sparse matrix. In certain embodiments of the present disclosure, an event may be counted as part of a signature even if the event is not present in all time points. If the event happens to be present in a large fraction of time points (e.g., over 90% of time points), then that event may still be included as part of the signature. A sequence of events may be viewed as a whole in addition to the occurrence of events in isolation. Similar to that explained above, a sequence of events may be included in a signature even if the sequences is not exact— for example, if the sequence is the most common sequence of events. At step 350, method 300 stores the signature of the maximal clique and an identifier identifying the known significant pattern to known significant pattern library 44 in storage.

Method 300 may further include, in response to determining that at least one maximal clique exists in candidate pattern list 42, determining a coherence, a repeatability, and a plurality of occurrences of the known significant pattern. Method 300 may also include determining a time at which the known significant pattern occurred and storing the coherence, the repeatability, the plurality of occurrences, and the time at which the known significant pattern to known significant pattern library 44 in storage. Method 300 may also include, in response to determining that at least one maximal clique exists in candidate pattern list 42, determining the known significant pattern that has a high significance, marking the known significant pattern that has the high significance as a dominant known significant pattern, and storing the dominant known significant pattern to the known significant pattern library 44.

Method 300 may further include, for each known significant pattern, determining a significance of the known significant pattern, determining whether the significance of the known significant pattern meets or exceeds minimum acceptance criteria, and, in response to determining that the significance of the known significant pattern does not meet or exceed the minimum acceptance criteria, not storing the known significant pattern to known significant pattern library 44 and discarding the known significant pattern.

Method 300 may include, for each known significant pattern, slicing the known significant pattern into at least one component, determining the significance of each of the at least one components, and storing the at least one component to known significant pattern library 44. In certain embodiments, method 300 may include receiving, from an external source, expert knowledge. Method 300 may include determining, based on the expert knowledge, whether to weight any points or correlations in candidate pattern list 42 or data associated with the known significant pattern. Such expert knowledge may come from, for example, system administrator 2 or a developer. In certain other embodiments, a user may input expert knowledge used to weight candidate pattern list 42. In response to determining to weight points or correlations in candidate pattern list 42 or data associated with the known significant pattern, method 300 may apply a mask comprising a plurality of weights to the points or correlations in candidate pattern list 42 or data associated with the known significant pattern that were determined to be weighted. For example, a user, system administrator 2, or developer may, based on his own knowledge, apply more or less weight in determining the significance of a known significant pattern to a particular correlation or set of correlations, a particular signature or component of the signature, etc. Any component may be weighted separately.

Figure 4:
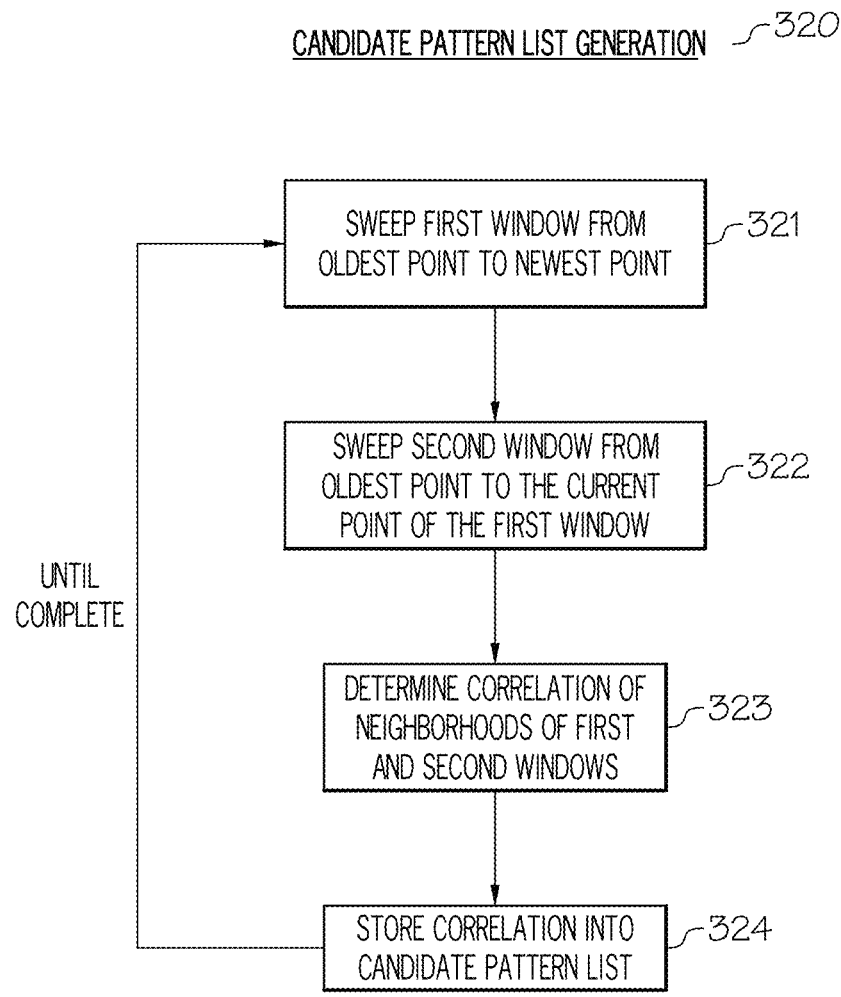
FIG. 4 illustrates a flow chart of a method generating a candidate pattern list in accordance with a non-limiting embodiment of the present disclosure.

With reference to FIG. 4, step 320 of method 300 is further illustrated. A candidate pattern list is generated at step 320. At step 321, method 300 sweeps a first sliding window through the plurality of historical data from an oldest point of historical data to a most recent point of the historical data. At step 322, method 300 sweeps a second sliding window through the plurality of historical data from a point of historical data at a current position of the first sliding window to the oldest point of historical data. At step 323, for each current position of the first sliding window and each current position of the second sliding window, method 300 determines, using processor 14 and a fuzzy logic algorithm, a correlation between at least one point in a neighborhood of the current position of the first sliding window and at least one point in a neighborhood of the current position of the second sliding window. The fuzzy logic algorithm allows method 300 to compute correlations which are not perfect 100% matches between two data points. Rather, they may be off, including 60-90% matches. The neighborhood may comprise any number of data points surrounding the point in the current position. The neighborhood of data points for the current position of the first sliding window may be a different size than the neighborhood of data points for the current position of the second sliding window. At step 324, method 300 stores the at least one point in the neighborhood of the current position of the first sliding window, the at least one point in the neighborhood of the current position of the second sliding window, and the correlation into candidate pattern list 42. In certain embodiments, these values are only stored if the correlation is above a predetermined threshold value.

In certain embodiments of the present disclosure, the correlations may be visualized in graph form for each sweep of the first window. The independent axis (X-axis) may depict the position of the (first) time window and the dependent axis (Y-axis) may depict the correlation value calculated during that sweep of the window. The time points with the highest correlation may appear as peaks (or nearbell shapes) in this graph. As one time window with a matching pattern passes the other time window, there may be a rise in the correlation, followed by a fall. This may cause the graph to have a bell shape in the correlation graph. However, the bell shape may not be exact. It may be jagged, shaped like a triangle, or in certain cases even shaped like a square. Because the bell shape is not always smooth, it is often referred to as a "peak" in the graph rather than referred to as a bell.

Figure 5:
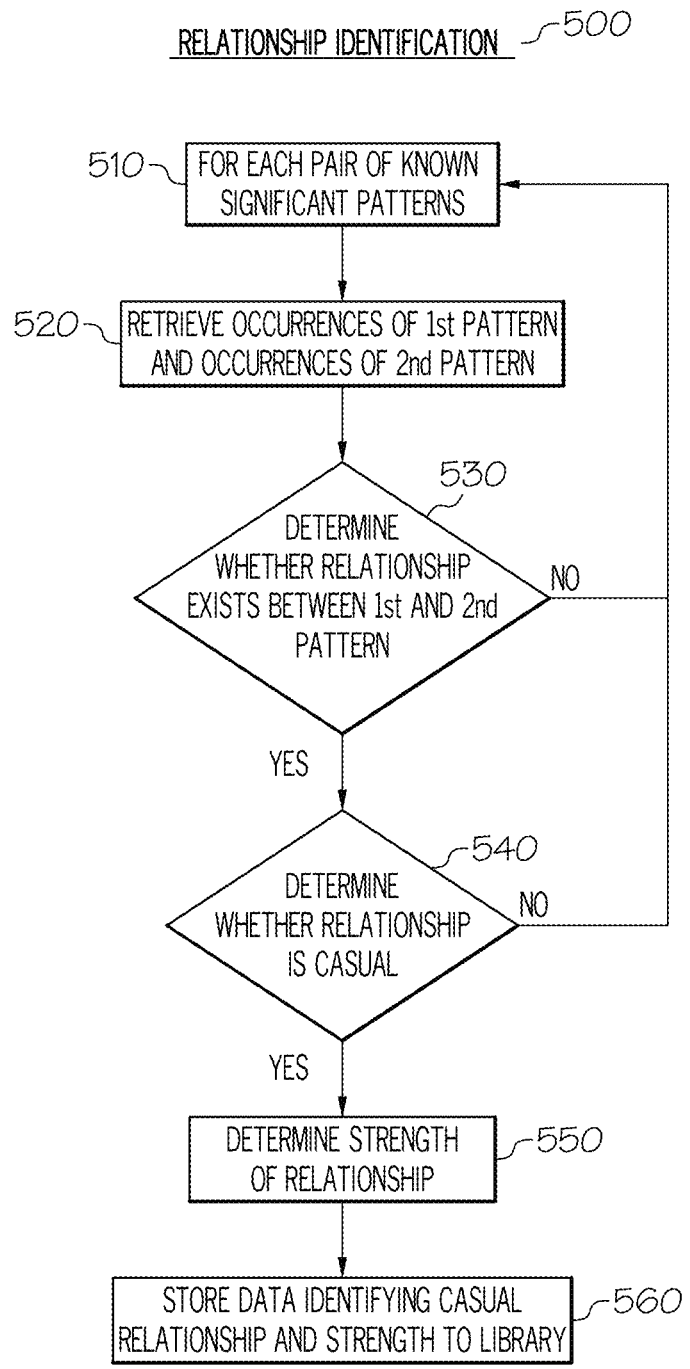
FIG. 5 illustrates a flow chart of a method identifying relationships between known significant patterns in accordance with a non-limiting embodiment of the present disclosure.

With reference to FIG. 5, method 500 for identifying causal relationships between known significant patterns is illustrated in accordance with a non-limiting embodiment of the present disclosure. Method 500 performs for each pair of known significant patterns at step 510. At step 520, method 500 retrieves a signature, a coherence, a repeatability, and a plurality of occurrences of a maximal clique for a first known significant pattern from known significant library 44. Method 500 may also retrieve a signature, a coherence, a repeatability, and a plurality of occurrences of a maximal clique for a second known significant pattern from known significant library 44. At step 530, method 500 determines whether a relationship exists between the first known significant pattern and the second known significant pattern. If no relationship exists, method 500 starts over with a new pair of patterns. If a relationship does exist, however, then at step 540, method 500 determines whether the relationship is causal. If the relationship is not causal, method 500 starts over with a new pair of patterns. If the relationship is causal, then at step 550, method 500 determines the strength of the causal relationship. At step 560, method 500 stores data identifying the causal relationship and/or the strength of the causal relationship to known significant pattern library 44.

In certain embodiments of the present disclosure, method 500 further determines statistics about the causal relationship between the first known significant pattern and the second known significant pattern. The statistics are determined by retrieving the plurality of occurrences of the first known significant pattern and the plurality of occurrences of the second known significant pattern from known significant pattern library 44, deriving a list of causalities by associating as many of the occurrences of the first known significant pattern as possible to the occurrences of the second known significant pattern, and determining statistics about the causal relationship from the list of causalities. Method 500 may further include storing the statistics to known significant pattern library 44 once determined.

Figure 6:
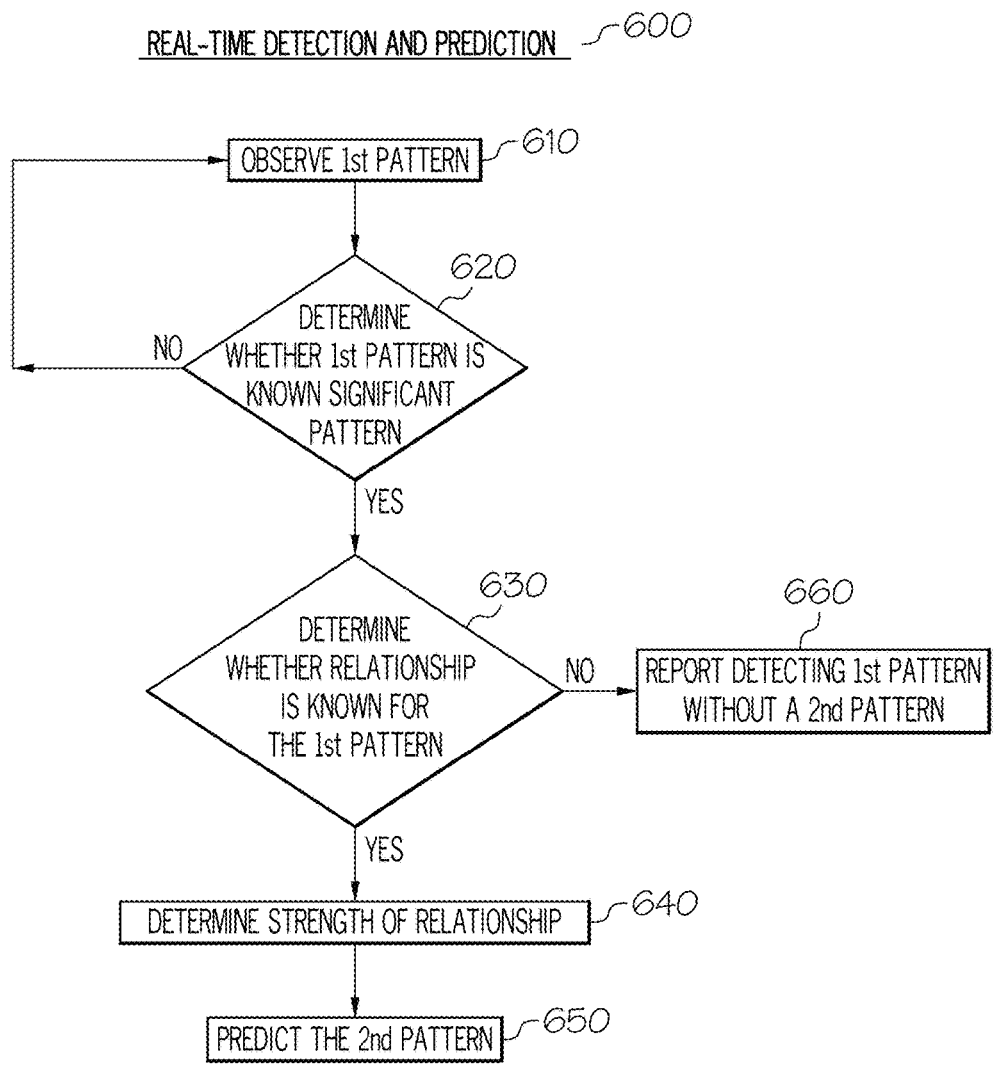
FIG. 6 illustrates a flow chart of a method detecting known significant pattern signatures in real-time and, in the case where there is a causally related known significant pattern, predicting that a significant pattern will occur in real-time in accordance with a non-limiting embodiment of the present disclosure.

With reference to FIG. 6, method 600 for predicting a significant pattern in real-time is illustrated in accordance with a non-limiting embodiment of the present disclosure. At step 610, method 600 observes a first pattern of data points. In certain embodiments of the present disclosure, a plurality of processors may monitor the plurality of real-time data from a plurality of system components to identify the first pattern. For example, the processors may poll the system for data. In one implementation, a million alarm IDs may be processed on a 5-minute interval at a 15% alarm rate. Multiple detection algorithms may run in parallel. The detection algorithm that is the most effective may win. At step 620, method 300 determines whether the first pattern is a known significant pattern. This may be accomplished by searching for the first pattern in known significant pattern library 44. If the first pattern is not a known significant pattern, then method 600 returns to the first step to observe a new pattern. In certain embodiments, method 600 may reject patterns which are not of interest to system administrator 2 or which the system has been taught to reject. If the first pattern is a known significant pattern, then at step 630, method 600 determines whether a relationship is known for the first pattern. For example, method 600 may determine whether a causal relationship is known between the first pattern and any second pattern. Method 600 may do so by determining whether data associated with the first pattern in known significant pattern library 44 identifies a causal relationship with a second known significant pattern. The second known significant pattern may indicate a negative event, such as a failure of a system component, or a positive event, such as an improvement in system performance.

If no causal relationship exists between the first known significant pattern and any second pattern, then at step 660 method 600 may report its detection of the first pattern without the occurrence of a second pattern with whom it shares a relationship. The method may end here, or the method 600 may further retrieve any other occurrences of the first pattern from known significant pattern library 44 and report the retrieved occurrences to system administrator 2. However, this step may be performed at any point in method 600 and need not occur after step 630. If a causal relationship does exist between the first known significant pattern and a second known significant pattern, then at step 640, method 600 determines the strength of the causal relationship. Method 600 may do so by retrieving data identifying the strength of the relationship from known significant pattern library 44. At step 650, method 600 predicts whether the second pattern will occur based on the strength of the causal relationship between the first and second patterns. In response to predicting that the second pattern will occur method 600 may further alert system administrator 2 in real-time that the second pattern will occur.

In certain embodiments, method 600 further includes, in response to determining that the first pattern has been marked as a known significant pattern, storing the first pattern as an occurrence of the known significant pattern in the known significant pattern library in the storage. Method 600 may also include determining statistics for the prediction that the second pattern will occur based on the strength of the causal relationship between the first pattern and the second pattern. These statistics may be provided to system administrator 2 in real-time. These statistics may also be stored and provided to system administrator 2 at a later time, for example as part of a generated report. In certain embodiments, alerting system administrator 2 in real-time that the second pattern will occur may also include providing system administrator 2 with metadata relating to the relationship between the first pattern and the second pattern. The metadata may include, among others, a time at which the second known significant pattern will occur, a probability that the second known significant pattern will occur, and/or a confidence that the second known significant pattern will occur.

Method 600 may further include reading, from known significant pattern library 44, a significance of the second pattern and, based on the significance of that second pattern, heightening the alert sent to system administrator 2 in real-time. For example, if a catastrophic failure has just occurred or is imminent, the system administrator may benefit from being alerted immediately, with an urgent notification. Method 600 may also include progressively reporting data to system administrator 2 as the first pattern is observed in real time. In certain embodiments, method 600 may include alerting system administrator 2 when a pattern re-appears in run-time data. System administrator 2 may choose to immediately or systematically remediate the data when an alert is received.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   reading a plurality of historical data from a storage;
   generating, using a processor, a candidate pattern list by:
      sweeping a first sliding window through the plurality of historical data from an oldest point of historical data to a most recent point of the historical data;
      sweeping a second sliding window through the plurality of historical data from a point of historical data at a current position of the first sliding window to the oldest point of historical data; and
      for each current position of the first sliding window and each current position of the second sliding window:
         determining, using the processor and a fuzzy logic algorithm, a correlation between at least one point in a neighborhood of the current position of the first sliding window and at least one point in a neighborhood of the current position of the second sliding window; and
         storing the at least one point in the neighborhood of the current position of the first sliding window, the at least one point in the neighborhood of the current position of the second sliding window, and the correlation into the candidate pattern list;
   determining, using the points stored in the candidate pattern list, whether at least one maximal clique exists in the candidate pattern list, each maximal clique indicating a known significant pattern; and
   in response to determining that at least one maximal clique exists in the candidate pattern list, for each of the at least one maximal cliques:
      determining a signature of the maximal clique; and
      storing the signature of the maximal clique and an identifier identifying the known significant pattern to a library in the storage.

2. The method of claim 1, wherein in response to determining that at least one maximal clique exists in the candidate pattern list, the method further comprises:
   determining a coherence, a repeatability, and a plurality of occurrences of the known significant pattern;
   determining a time at which the known significant pattern occurred; and
   storing the coherence, the repeatability, the plurality of occurrences, and the time at which the known significant pattern occurred to the library in the storage.

3. The method of claim 1, further comprising, in response to determining that at least one maximal clique exists in the candidate pattern list:
   determining the known significant pattern that has a high significance;
   marking the known significant pattern that has the high significance as a dominant known significant pattern; and
   storing the dominant known significant pattern to the library in the storage.

4. The method of claim 1, further comprising, for each known significant pattern:
   determining a significance of the known significant pattern;
   determining whether the significance of the known significant pattern meets or exceeds minimum acceptance criteria; and
   in response to determining that the significance of the known significant pattern does not meet or exceed the minimum acceptance criteria:
      not storing the known significant pattern to the library in the storage; and
      discarding the known significant pattern.

5. The method of claim 1, further comprising, for each known significant pattern:
   slicing the known significant pattern into at least one component;
   determining a significance of each of the at least one components; and
   storing the at least one component to the library in the storage.

6. The method of claim 1, further comprising:
   receiving, from an external source, expert knowledge;
   determining, based on the expert knowledge, whether to weight any points or correlations in the candidate pattern list or data associated with the known significant pattern; and
   in response to determining to weight points or correlations in the candidate pattern list or data associated with the known significant pattern, applying a mask comprising a plurality of weights to the points or correlations in the candidate pattern list or data associated with the known significant pattern that were determined to be weighted.

7. The method of claim 1, wherein the plurality of historical data read from the storage comprises data selected from the group consisting of times series data, alarms, and log file entries.

8. The method of claim 7, wherein the time series data comprises events including Quality of Service (QoS) messages.

9. The method of claim 1, further comprising:
retrieving a signature, a coherence, a repeatability, and a plurality of occurrences of a maximal clique for a first known significant pattern from the library in the storage;
retrieving a signature, a coherence, a repeatability, and a plurality of occurrences of a maximal clique for a second known significant pattern from the library in the storage;
determining whether a relationship exists between the first known significant pattern and the second known significant pattern; and
in response to determining that a relationship exists between the first known significant pattern and the second known significant pattern:
determining whether the relationship between the first known significant pattern and the second known significant pattern is causal;
determining a strength of the causal relationship between the first known significant pattern and the second known significant pattern; and
storing data identifying the causal relationship and the strength of the causal relationship to the library in the storage.

10. The method of claim 9, further comprising:
determining statistics about the causal relationship between the first known significant pattern and the second known significant pattern by:
retrieving the plurality of occurrences of the first known significant pattern and the plurality of occurrences of the second known significant pattern from the library in the storage;
deriving a list of causalities by associating as many of the occurrences of the first known significant pattern as possible to the occurrences of the second known significant pattern; and
determining statistics about the causal relationship from the list of causalities; and
storing the statistics to the library in the storage.

11. A computer configured to access a storage device, the computer comprising:
a processor; and
a non-transitory, computer-readable storage medium storing computer-readable instructions that when executed by the processor cause the computer to perform:
reading a plurality of historical data from a storage;
generating, using the processor, a candidate pattern list by:
sweeping a first sliding window through the plurality of historical data from an oldest point of historical data to a most recent point of the historical data;
sweeping a second sliding window through the plurality of historical data from a point of historical data at a current position of the first sliding window to the oldest point of historical data; and
for each current position of the first sliding window and each current position of the second sliding window:
determining, using the processor and a fuzzy logic algorithm, a correlation between at least one point in a neighborhood of the current position of the first sliding window and at least one point in a neighborhood of the current position of the second sliding window; and
storing the at least one point in the neighborhood of the current position of the first sliding window, the at least one point in the neighborhood of the current position of the second sliding window, and the correlation into the candidate pattern list;
determining, using the points stored in the candidate pattern list, whether at least one maximal clique exists in the candidate pattern list, each maximal clique indicating a known significant pattern; and
in response to determining that at least one maximal clique exists in the candidate pattern list, for each of the at least one maximal cliques:
determining a signature of the maximal clique; and
storing the signature of the maximal clique and an identifier identifying the known significant pattern to a library in the storage.

12. The computer of claim 11, wherein in response to determining that at least one maximal clique exists in the candidate pattern list, the computer-readable instructions further cause the computer to perform:
determining a coherence, a repeatability, and a plurality of occurrences of the known significant pattern;
determining a time at which the known significant pattern occurred; and
storing the coherence, the repeatability, the plurality of occurrences, and the time at which the known significant pattern occurred to the library in the storage.

13. The computer of claim 11, wherein in response to determining that at least one maximal clique exists in the candidate pattern list, the computer-readable instructions further cause the computer to perform:
determining the known significant pattern that has a high significance;
marking the known significant pattern that has the high significance as a dominant known significant pattern; and
storing the dominant known significant pattern to the library in the storage.

14. The computer of claim 11, wherein the computer-readable instructions further cause the computer to perform, for each known significant pattern:
determining a significance of the known significant pattern;
determining whether the significance of the known significant pattern meets or exceeds minimum acceptance criteria; and
in response to determining that the significance of the known significant pattern does not meet or exceed the minimum acceptance criteria:
not storing the known significant pattern to the library in the storage; and
discarding the known significant pattern.

15. The computer of claim 11, wherein the computer-readable instructions further cause the computer to perform, for each known significant pattern:
slicing the known significant pattern into at least one component;
determining a significance of each of the at least one components; and storing the at least one component to the library in the storage.

16. The computer of claim 11, wherein the computer-readable instructions further cause the computer to perform:
  receiving, from an external source, expert knowledge;
  determining, based on the expert knowledge, whether to weight any points or correlations in the candidate pattern list or data associated with the known significant pattern; and
  in response to determining to weight points or correlations in the candidate pattern list or data associated with the known significant pattern, applying a mask comprising a plurality of weights to the points or correlations in the candidate pattern list or data associated with the known significant pattern that were determined to be weighted.

17. The computer of claim 11, wherein the plurality of historical data read from the storage comprises data selected from the group consisting of times series data, alarms, and log file entries.

18. The computer of claim 11, wherein the time series data comprises events including Quality of Service (QoS) messages.

19. The computer of claim 11, wherein the computer-readable instructions further cause the computer to perform:
  retrieving a signature, a coherence, a repeatability, and a plurality of occurrences of a maximal clique for a first known significant pattern from the library in the storage;
  retrieving a signature, a coherence, a repeatability, and a plurality of occurrences of a maximal clique for a second known significant pattern from the library in the storage;
  determining whether a relationship exists between the first known significant pattern and the second known significant pattern; and
  in response to determining that a relationship exists between the first known significant pattern and the second known significant pattern:
    determining whether the relationship between the first known significant pattern and the second known significant pattern is causal;
    determining a strength of the causal relationship between the first known significant pattern and the second known significant pattern; and
    storing data identifying the causal relationship and the strength of the causal relationship to the library in the storage.

20. A computer program product comprising:
  a computer-readable storage medium having computer-readable program code embodied therewith, the computer-readable program code comprising:
    computer-readable program code configured to read a plurality of historical data from a storage;
    computer-readable program code configured to generate, using a processor, a candidate pattern list by:
      sweeping a first sliding window through the plurality of historical data from an oldest point of historical data to a most recent point of the historical data;
      sweeping a second sliding window through the plurality of historical data from a point of historical data at a current position of the first sliding window to the oldest point of historical data; and
      for each current position of the first sliding window and each current position of the second sliding window:
        determining, using the processor and a fuzzy logic algorithm, a correlation between at least one point in a neighborhood of the current position of the first sliding window and at least one point in a neighborhood of the current position of the second sliding window; and
        storing the at least one point in the neighborhood of the current position of the first sliding window, the at least one point in the neighborhood of the current position of the second sliding window, and the correlation into the candidate pattern list;
    computer-readable program code configured to determine, using the points stored in the candidate pattern list, whether at least one maximal clique exists in the candidate pattern list, each maximal clique indicating a known significant pattern; and
    computer-readable program code configured to, in response to determining that at least one maximal clique exists in the candidate pattern list, for each of the at least one maximal cliques:
      determine a signature of the maximal clique; and
      store the signature of the maximal clique and an identifier identifying the known significant pattern to a library in the storage.

* * * * *